United States Patent [19]
Iwasaki et al.

[11] Patent Number: 5,530,830
[45] Date of Patent: Jun. 25, 1996

[54] DISK ARRAY SYSTEM

[75] Inventors: Hidehiko Iwasaki, Hiratsuka; Ryoichi Suzuki, Kanagawa-ken; Yoshinori Tsuneda, Odawara; Katsutoshi Mizuno, Kanagawa-ken; Hidemi Baba, Odawara, all of Japan

[73] Assignees: Hitachi, Ltd., Tokyo; Hitachi Computer Peripherals Co., Ltd., Odawara, both of Japan

[21] Appl. No.: 163,022

[22] Filed: Dec. 6, 1993

[30] Foreign Application Priority Data

Dec. 8, 1992 [JP] Japan .................................. 4-328173

[51] Int. Cl.[6] ................................................. G06F 12/00
[52] U.S. Cl. .................... 395/441; 395/842; 364/DIG. 2; 364/752.1; 364/957; 364/957.5
[58] Field of Search ................................. 395/400, 425, 395/525, 275, 438, 437, 441, 474, 477, 481, 180, 842, 847

[56] References Cited

U.S. PATENT DOCUMENTS 5,210,860  5/1993  Pfeffer et al. ...................... 395/575
5,249,279  9/1993  Schmenk et al. .................. 395/425
5,408,644  4/1995  Schneider et al. ................. 395/425
5,418,925  5/1995  DeMoss et al. .................... 395/425

FOREIGN PATENT DOCUMENTS 2236714  9/1990  Japan .

*Primary Examiner*—Rebecca L. Rudolph
*Attorney, Agent, or Firm*—Kenyon & Kenyon

[57] ABSTRACT

A disk array system having a plurality of disk units includes an upper-level data transfer controller for controlling transfer of data to and from an upper-level apparatus, a data buffer for temporarily storing therein data from the upper-level apparatus, a drive data transfer controller for controlling the data transfer between the buffer and the units, and a main microprocessor for controlling the the transfer controllers. When transferring data, the microprocessor indicates an address to be used in the buffer and a distribution mode of data to the data transfer controllers so that the data transfer is conducted thereafter without intervention of the microprocessor. During the transfer, the microprocessor can generate information for a subsequent data transfer to indicate the information to the transfer controllers. After a data transfer is terminated, the pertinent transfer controller can immediately execute the next data transfer, which increases the utilization efficiency of the data bus.

12 Claims, 8 Drawing Sheets

DISK ARRAY SYSTEM

BACKGROUND OF THE INVENTION

1. Field of the Invention

The present invention relates to a data transfer circuit and a data transfer control method for use with a disk array system in which data is stored in a plurality of disk units in a distributed fashion so as to conduct reproduction or playback of the stored data.

2. Description of the Related Art

As a conventional technology related to a data transfer circuit and a data transfer control method for a disk array system, there has been known, for example, the JP-A-2-236714 entitled "Array-Type Disk Drive Mechanism System and method". According thereto, data is distributed to be stored in a plurality of disk units. To implement a high-speed transfer of data, there is employed a primary microprocessor executing operations at a high speed. The microprocessor controls data transfer in a segment unit, for example, in a 512-byte unit.

In a case where the speed of data transfer to and from an upper-level apparatus is desired to be increased, if the data control is achieved by the primary microprocessor for each data transfer in the segment unit, there will appear an overhead time due to processing of the microprocessor and hence the data transfer efficiency of the internal bus will be lowered. When the size of data transferred to and from the upper-level apparatus is similar to that of the data segment, the overhead time hardly exerts influence upon the data transfer speed. However, when the former is increased, the overhead directly becomes to be a bottleneck in improving the speed of data transfer to and from the upper-level apparatus.

SUMMARY OF THE INVENTION

It is therefore an object of the present invention to provide a disk array system for increasing the transfer speed of data communicated with an upper-level apparatus.

Another object of the present invention is to provide a disk array system for achieving data transfer to and from an upper-level apparatus without intervention of a primary microprocessor.

Still another object of the present invention is to provide a disk array system for developing a high efficiency of bus utilization in the data transfer regardless of the amount of data to be transferred at a time.

In order to achieve the objects above, according to the present invention, there is provided a disk array system having a plurality of disk units classified into several groups so as to supplying upper-level apparatuses with data stored therein. The system includes an upper-level data transfer control section for controlling transfer of data to an upper-level apparatus, a data buffer for temporarily storing therein data when the control section transfers data to and from an upper-level apparatus, a data buffer control circuit for controlling the data buffer, a drive data transfer control section disposed for each of the groups for controlling a data transfer between the data buffer and a disk unit belonging to the group, and a primary microprocessor section for controlling the upper-level data transfer control section, the data buffer control circuit, and the drive data transfer control section. Moreover, the microprocessor section includes a primary microprocessor bus for controlling the upper-level data transfer control section, the data buffer control circuit, and the drive data transfer control section, a data transfer bus for transferring data between the upper-level data transfer control section, the data buffer control circuit, the data buffer, and the drive data transfer control section. The microprocessor section controls the upper-level data transfer control section, the data buffer control circuit, and the drive data transfer control section via the primary microprocessor bus and transfers data between the upper-level data transfer control section or the drive data transfer control section and the data buffer via the data transfer bus. In the operations, each of the transfer control sections can independently achieve data transfers to and from the data buffer.

According to the present invention, when transferring data, the primary microprocessor indicates an address of a data buffer reserved, information to distribute data, and the like to each data transfer control section so as to transfer a plurality of data segments without intervention of the microprocessor. During the data transfer, the microprocessor can generate information for a subsequent data transfer to indicate the information to the respective transfer control sections. After a data transfer being executed is completed, the pertinent control section can immediately commence the next data transfer. This resultantly increases the utilization efficiency of the data transfer bus.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the accompanying drawings, description Will be given in detail of embodiments according to the present invention.

Figure 1:
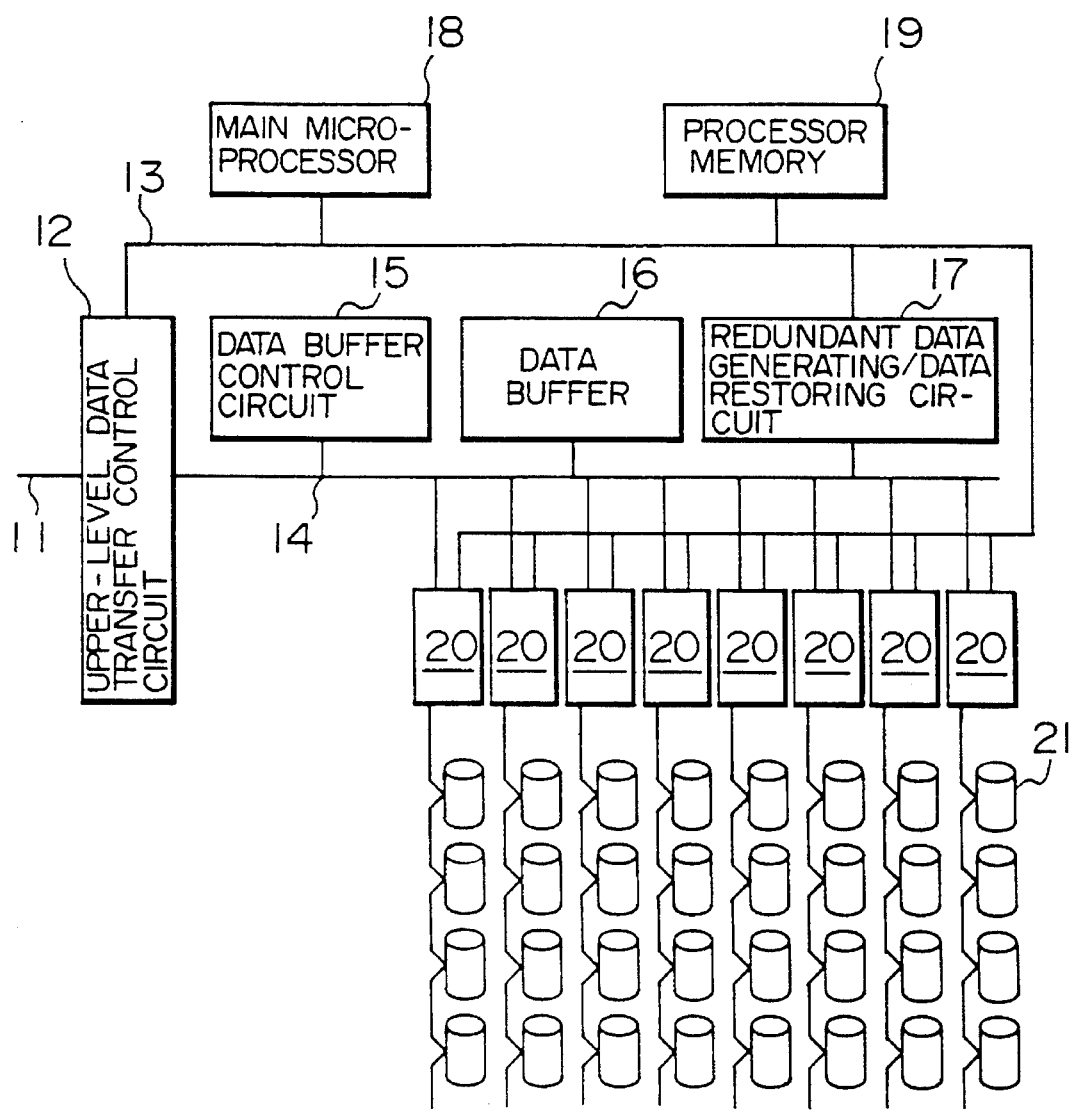
FIG. 1 is a block diagram showing the structure of a disk array system of the present invention.

FIG. 1 shows the structure of a disk array system according to an embodiment of the present invention. The system serves as a storage of a computer system. In the embodiment, the disk array system is connected to a computer via a host SCSI bus 11 functioning as a general-purpose input/output (I/O) interface.

The disk array system includes the host SCSI bus 11, an upper-level data transfer control circuit 12, a data bus 13 for a main microprocessor, a data bus 14 for transferring data therethrough, a data buffer control circuit 15, a data buffer 16, a redundant data generating/data restoring circuit 17, a main microprocessor 18, a processor memory 19, drive data transfer control circuits 20, and disk units (disk drive mechanism) 21.

The microprocessor 18 receives a command transferred from a computer via the host SCSI bus 11 and the circuit 12 and then analyzes the command. The microprocessor 18 conducts optimization processing to execute the command. When the command is a data transfer request, the microprocessor 18 issues a data transfer instruction to the transfer control circuits 12 and 20 via the data bus 13. When it is impossible to accomplish the data transfer immediately after a command reception, the microprocessor 18 can receive the next command from a computer. After the microprocessor has received the plural commands, if the data transfer is ready during the analyzing and optimizing processing, the microprocessor 18 issues the data transfer instruction via the data bus 13 to the transfer control circuits 12 and 20. In the configuration, the data buses 13 and 14 are separated from each other. Software and work memory areas to be used by the microprocessor 18 exist in the memory 19 connected to the data bus 13. Consequently, during execution of a data transfer, it is possible for the microprocessor 18 to conduct the command analysis, the optimization, and issuance of the data transfer instruction for the next data transfer.

A data transfer is started when the microprocessor 18 sends a data transfer instruction to the transfer control circuits 12 and 20. When data transferred from the computer is to be written in the disk units 21, the transfer control circuit 12 divides the data received from the computer in units of 512-byte data blocks and then transfers the data blocks to the buffer 16 and the circuit 17 one by one. After completely producing redundant data for the received data, the circuit 17 transfers the produced data to the buffer 16. The transfer control circuit 20 acquires the data from the buffer 16 to transfer the data to the units 21. Depending on cases, to generate redundant data when necessary, the transfer control circuit 20 reads data from the units 21 and then sends the data to the circuit 17.

When data read from the units 21 is to be transferred to the computer, the transfer control circuit 20 transfers the data to the buffer 16. Then, the transfer control circuit 12 obtains the transfer data from the buffer 16 to transfer the data to the computer.

Referring now to FIGS. 2 to 5, description will be given of the data transfer according to the embodiment.

Figure 2:
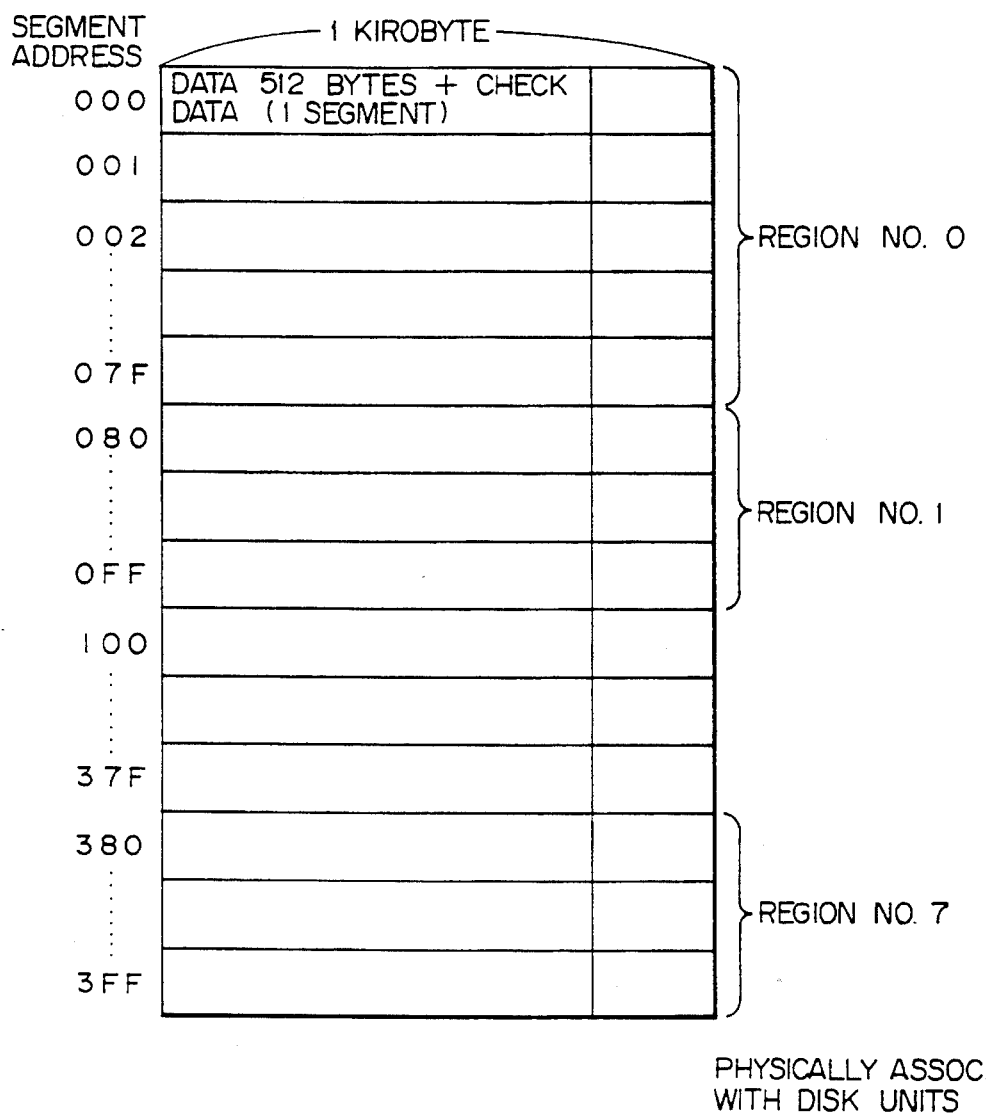
FIG. 2 is a diagram for explaining a data buffer.

FIG. 2 shows the construction of the buffer 16 of the embodiment. The buffer 16 includes one-megabit dynamic random access memories (DRAMs) and has a capacity of one megabyte. The buffer 16 is used to valance the data transfer rate of the computer with that of the disk unit 21, and to temporarily save data in a multiplexed data transfer. In this embodiment, data received from the computer is divided in units of 512-byte data blocks. Check data is added to each of the data blocks to produce a data segment, which is transferred. To facilitate an address control operation, the buffer 16 area is partitioned in units of one-kilobyte regions such that each segment data is stored in the partitioned region. Each of the transfer control circuits 12 and 20 uses addresses in unit of segment to access the buffer 16. Furthermore, the buffer 16 area is divided into eight regions in association with the physical distribution of the disk units 21 in some cases. In the case, three high-order bits of the segment address designate a region number.

Figure 3:
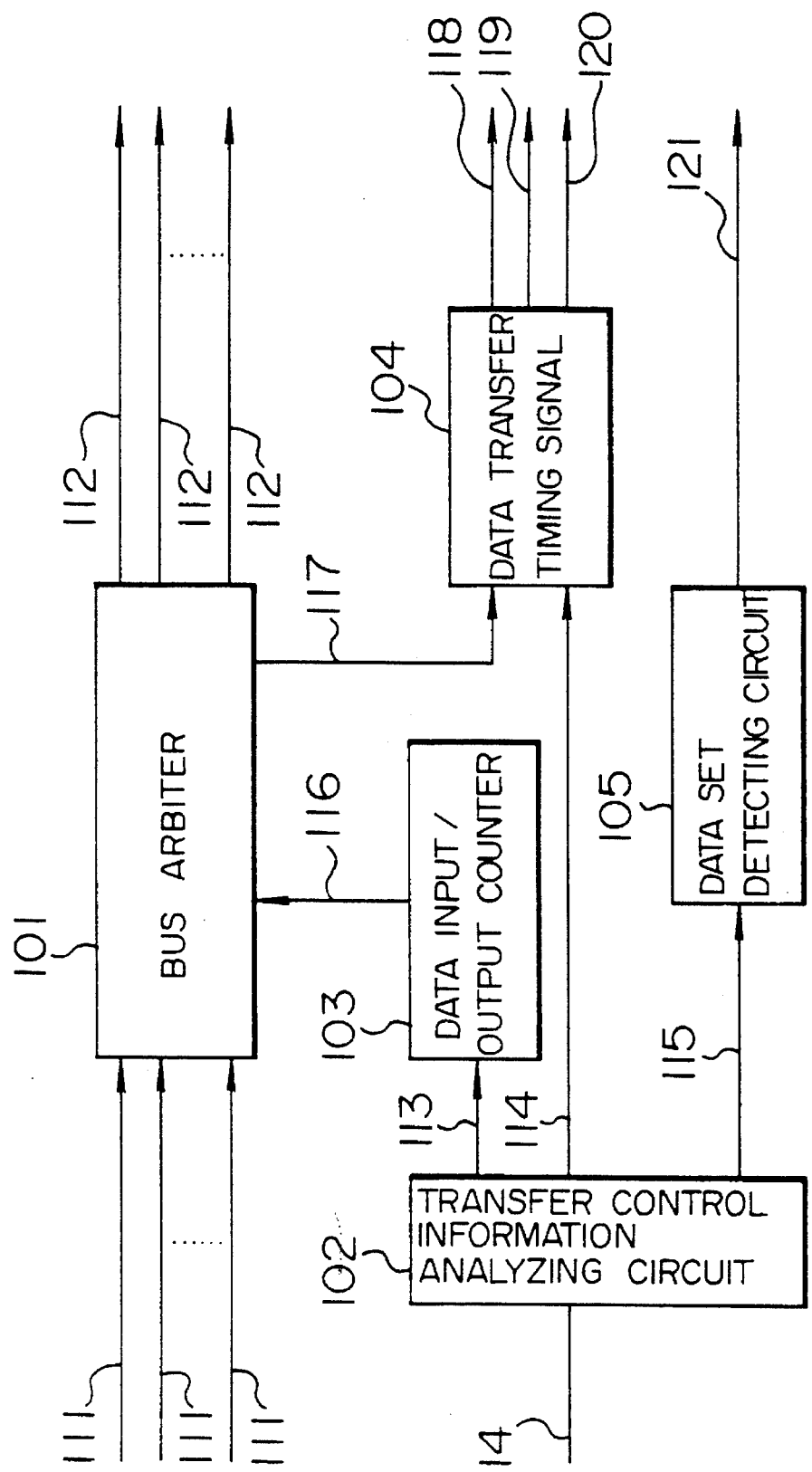
FIG. 3 is a block diagram showing the construction of a data buffer control circuit.
Figure 4:
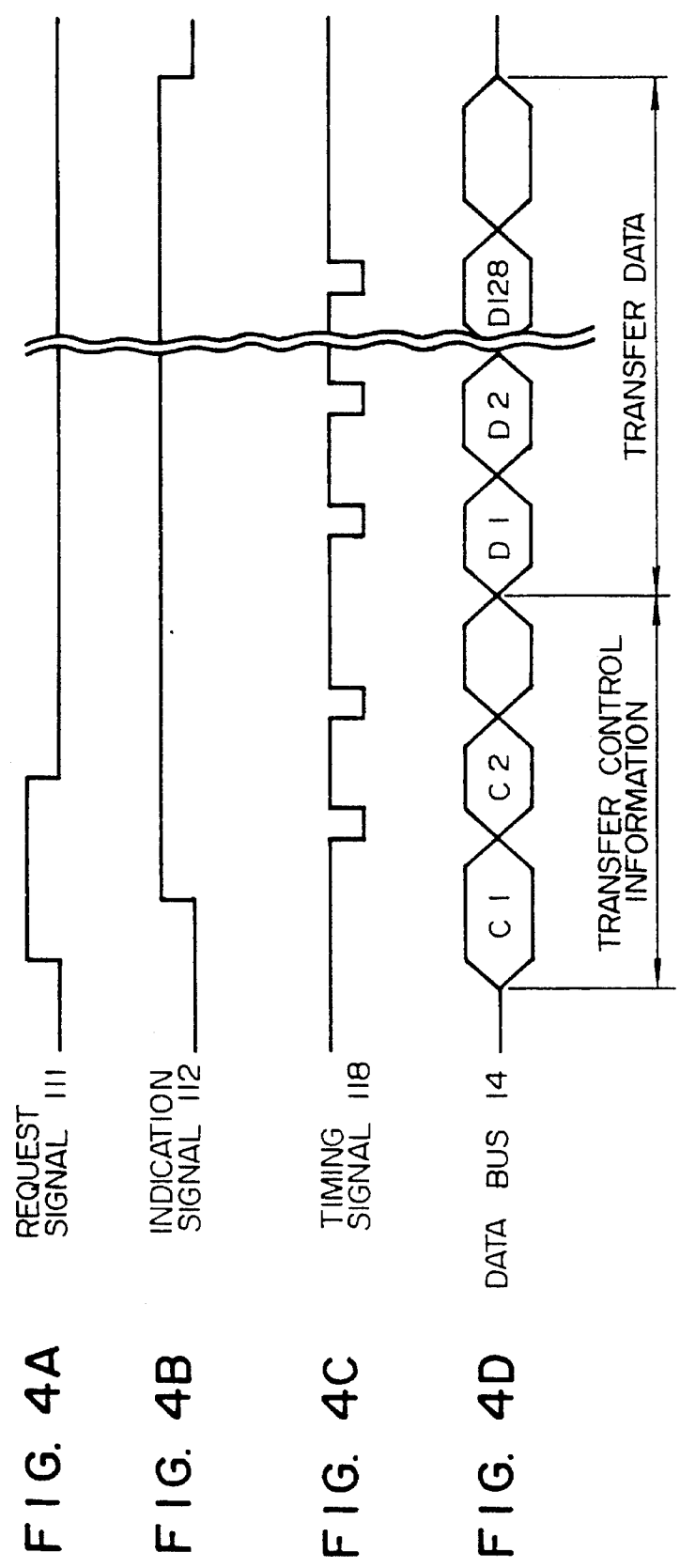
FIGS. 4A to 4D are signal timing charts showing signal timings to transfer data.

FIG. 3 shows the configuration of the buffer control circuit 15 of the embodiment. The circuit 15 includes a bus arbiter 101 to arbitrate the utilization or access right to the bus 14, an analysis circuit 102 to analyze transfer control information sent from the transfer control circuits 12 and 20, a counter 103 to count the number of input and output data segments for each region of the buffer 16, a timing signal generator 104 to generate a timing signal of data transfer and a read/write timing signal for the buffer 16 based on the transfer control information, and a data set detecting circuit 105 to detect a data set.

FIGS. 4A to 4D show time charts of signals in a data transfer between the transfer control circuits 12 and 20 and the buffer 16. When each of the transfer control circuits 12 and 20 outputs a data transfer request signal 111, the arbiter 101 conducts arbitration of the data bus 14 to select one of the circuits 12 and 20 and sends a data transfer indication signal 112 to the selected circuit and a transfer start indication signal 117 to the generator 104 at the same time. On receiving the signal 117, the generator 104 outputs twice a data transfer timing signal 118. The selected circuit then outputs data transfer control information onto the bus 14 at the timing synchronous with the signal 118 such that the analyzing circuit 102 in the buffer control circuit 15 takes in the outputted information.

From the information, the circuit 102 extracts a data transfer direction, a data transfer destination, a data length of the segment, and the like and then outputs the extracted result as a data transfer control signal 114 to the generator 104. In response to the signal 114, the generator 104 outputs the signal 118, a data buffer transfer control signal 119, and a redundant data generator transfer control signal 120 for the one-segment data. The counter 103 is incremented or decremented according to data count information extracted from the transfer control information. The counter 103 includes eight up-down counters corresponding to eight regions of the buffer 16, each of which indicates the number of data segments remaining therein for one region to enable or disable a data transfer according to the value thereof. That is, this makes it possible to use the buffer 16 as a first-in first-out (FIFO) memory. A large number of data transfer requests sources designate transfer information including data transfer destinations, data transfer destination addresses, and the like to perform the data transfer. Therefore, data transfer control for every one data segment can be successively performed by hardware, thereby increasing the utilization efficiency of the bus 14. In the embodiment, the data bus width and the data transfer period are set respectively to four bytes and 80 nanoseconds (ns) to obtain the maximum data transfer rate of 50 megabytes (MB) per second. Also even when the overhead time required for transfer control information is taken into consideration, to data transfer rate of 40 MB/s or more is possible.

Figure 5:
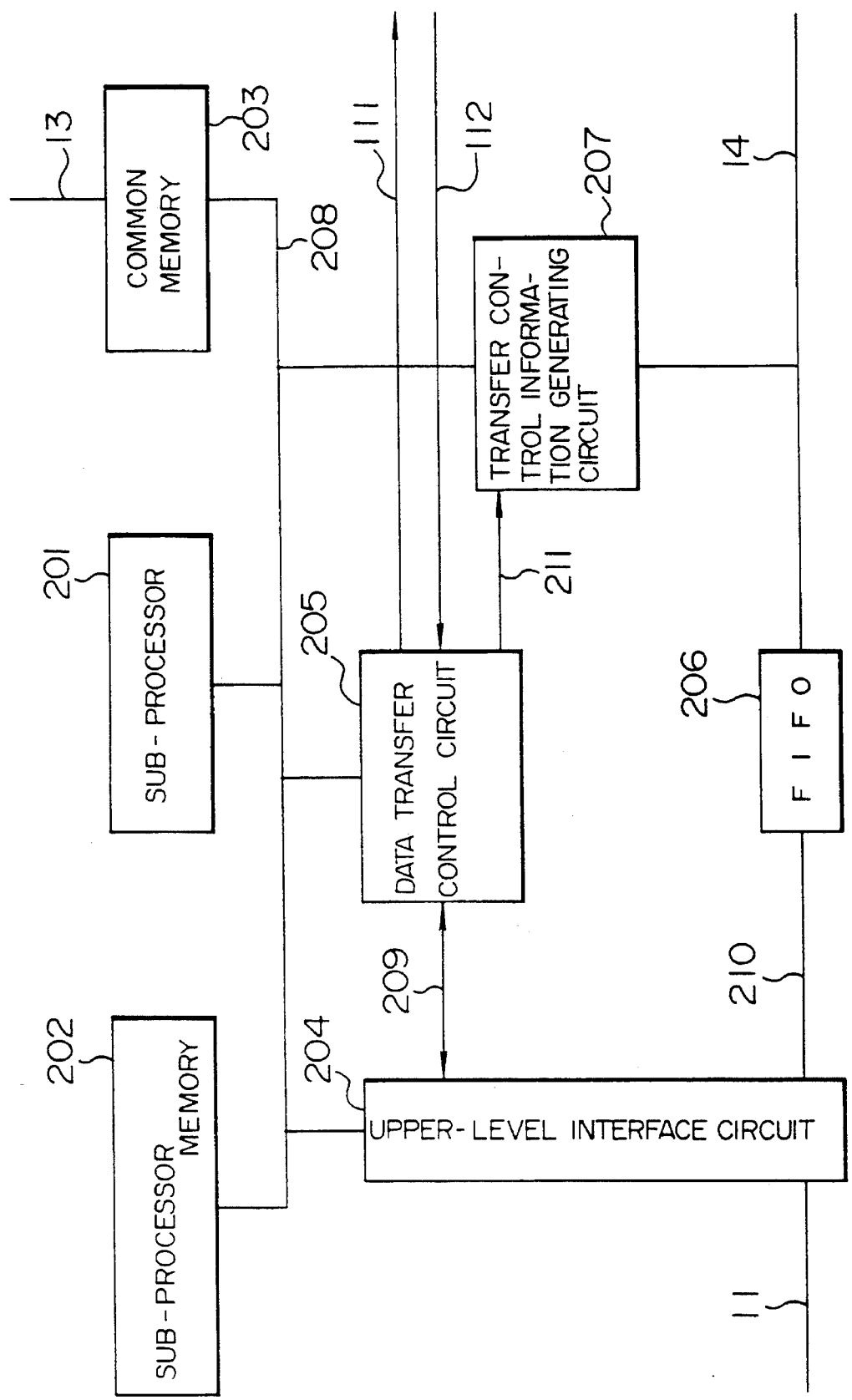
FIG. 5 is a block diagram showing the constitution of an upper-level data transfer control circuit.

FIG. 5 shows the structure of the transfer control circuit 12. The transfer control circuit 12 includes a sub-processor 201 to supervise or control the circuit 12, a sub-processor memory 202, a common or shared memory 203 used for communication with the main microprocessor 18, an interface circuit 204 for an upper-level apparatus, a data transfer control circuit 205, and a transfer control information generator 207, and FIFO memory 206. In a data transfer, the sub-processor 201 receives from the microprocessor 18 via the memory 203 information necessary to transfer data such as a data distribution mode (a number assigned to a data transfer destination), an address of the buffer 16 to be used, and an amount of transfer data. According to the information received from the microprocessor 18, the sub-processor 201 initializes the circuits 204, 205, and 207 and then starts transferring data.

The circuit 204 functions as an interface for a computer. Data transferred from the computer is stored in the FIFO memory 206 via the interface circuit 204. When the amount of data received from the computer becomes to be 512 bytes in the FIFO memory 206, the transfer control circuit 205 sends the request signal 111 to the buffer control circuit 15. Thereafter, when the transfer indication signal 112 is received from the buffer control circuit 15, the transfer control circuit 205 instructs a transfer control information generator 207 to output data transfer control information of two words. After the control information is output, the transfer control circuit 205 commences transferring data of one segment.

The data transfer control information is as follows.

TABLE 1

Data transfer control information

| | No. of bits |
|---|---|
| (a) Contents of control information | |
| Direction of data transfer | 1 |
| Tranfser data to data buffer | 1 |
| Transfer data to redundant data generator | 1 |
| Data length of one segment | 9 |
| Segment address of destination data buffer | 13 |
| Control data input/output counter | 20 |
| Control detection of data group (transfer end flag, etc.) | 9 |
| Transfer control of data output from redundant data generator | 4 |
| Segment address of destination buffer for redundant data | 13 |
| (b) Contents of control of data input/output counter | |
| Control of data input/output counter | 4 |
| Decrement value of data input/output counter | 8 |
| Indicate resetting of data input/output counter | 8 |

Since the data transfer control information is limited to eight bytes in this example, some bits thereof are used to designate a plurality of information items depending on cases.

The transfer control circuit 205 includes registers to set therein a data length of a segment, a transfer direction, a data transfer destination, etc. and an address generator to produce addresses of the data buffer 16 as a destination. In a case where the data buffer 16 is physically assigned to each disk unit 21, data is distributed/integrated when transferred to/from the buffer. At this time, the destination address is uniquely decided according to the data distribution mode, a start address of the buffer, etc. Consequently, the address can be generated by hardware. After outputting the two-word transfer control information, the generator 207 calculates a subsequent transfer address for a data transfer of the next data segment.

The configuration of the transfer control circuit 20 is almost the same as that of the transfer control circuit 12. Consequently, these circuits 20 and 12 operate in substantially identical fashion. However, as for the circuit 20, since the data distribution and integration (collection) is not required to be considered in the data transfer operations to/from the data buffer, the structure of the address generator is simplified.

Figure 6:
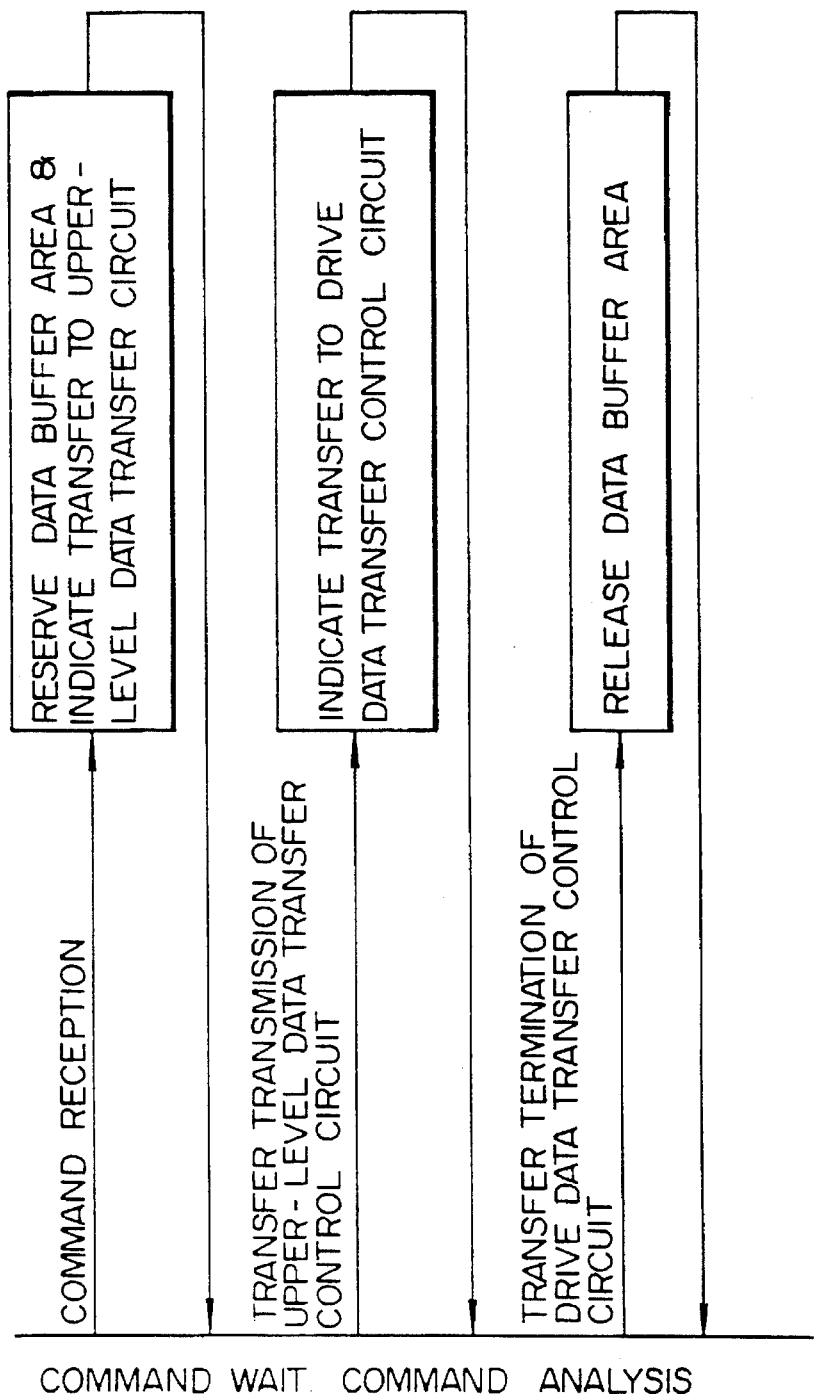
FIG. 6 is a diagram for explaining a transfer control operation a high transaction state.
Figure 7:
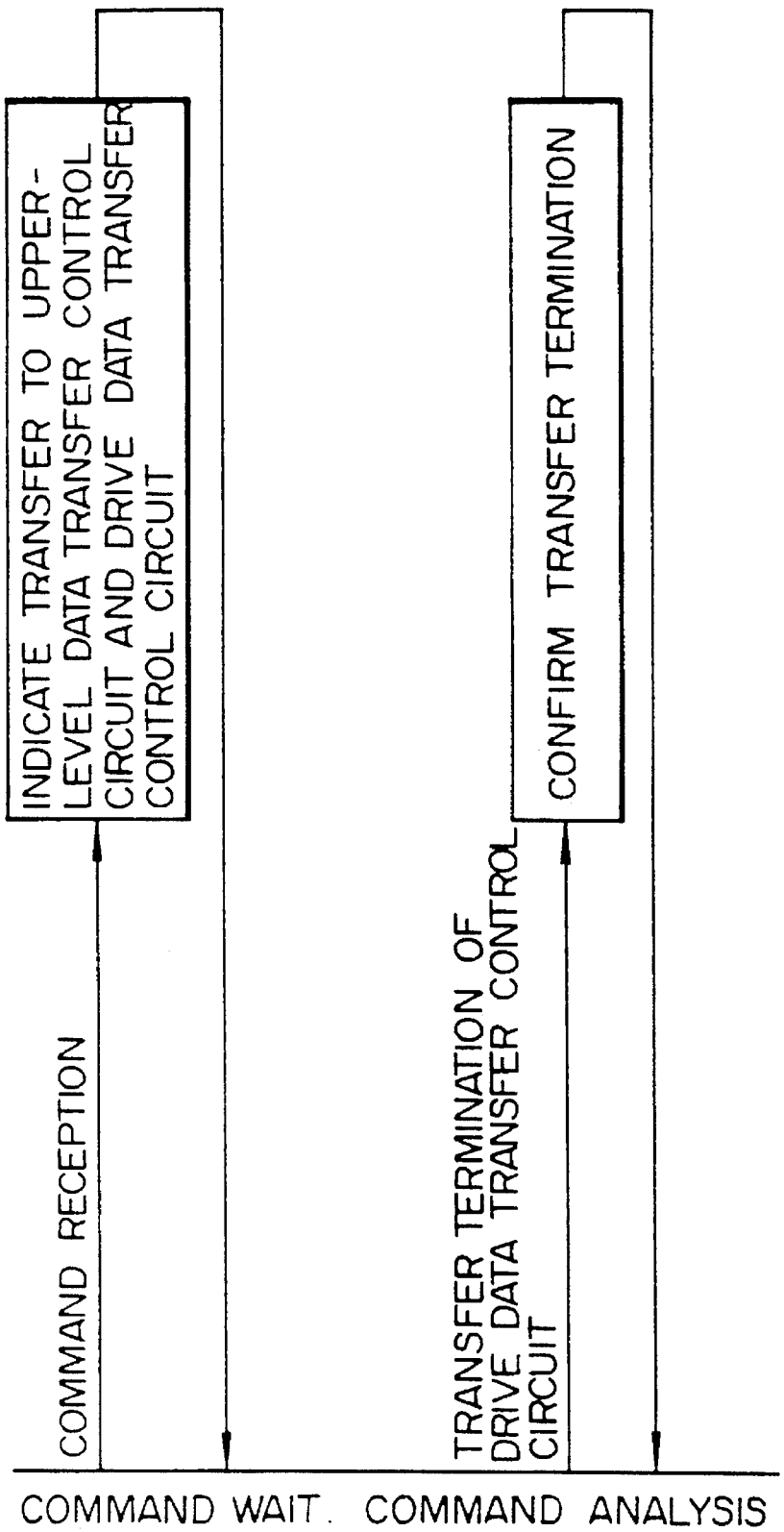
FIG. 7 is a diagram for explaining a transfer control operation for a large amount of data.

FIGS. 6 and 7 show examples of the data transfer control in the embodiment. In an operation to communicate data with a computer, the specific control method of data transfer varies between a case where data having a small size are transferred in a high-transaction rate and a case where data each having a large size are transferred.

In the processing example of FIG. 6 showing a case where data size for once data transfer is small and there is required a high transaction rate, data transferred from a computer is written in the disk unit 21. In this situation, the counter 103 of the buffer control circuit 15 is not used and there is no physical correspondence between the data buffer and the disk unit. Namely, the data transfer is controlled according to a method similar to the conventional method.

On receiving a command from a computer, the microprocessor 18 reserves an area of the buffer 16 to store data to be communicated with the computer. When the area is reserved, the microprocessor 18 indicates an address of the buffer 16 to be used and a data transfer to the circuit 12. Until termination of the transfer is notified, the microprocessor 18 analyzes a subsequent command and indicates a data transfer. On receiving the indication of transfer, the transfer control circuit 12 initiates receiving data from the computer and then continues transferring data under hardware control until the data reception from the computer is terminated. When there is no data to be transferred, a termination of transfer is reported to the microprocessor 18. Thereafter, if a transfer of next data has already been indicated, a data transfer is successively executed.

On receiving a report of termination of data transfer from the transfer control circuit 12, the microprocessor 18 indicates an address of buffer area in which data to be transferred is stored and an initiation of transfer to the transfer control circuits 20. The microprocessor 18 then returns to a command wait/analysis state. According to the indication, the transfer control circuits 20 transfer data from the buffer 16 to the disk units 21. When the data is completely transferred, each transfer control circuit 20 reports a termination of transfer to the microprocessor 18. In a case where the report of transfer termination is received from each of the transfer control circuits to which data transfer have been indicated, the microprocessor 18 releases the reserved areas of the buffer 16.

Through the above operation, the microprocessor 18 controls the data transfer for each of the commands from computers, not for each segment as the transfer unit. In consequence, there does not take place the overhead time in the microprocessor 18. This increases the utilization efficiency of the data bus 14 and the transfer rate of data to and from computers. Moreover, the microprocessor 18 is released from the realtime processing such as processing to match a data transfer timing.

FIG. 7 shows a processing example in which data size for once data transfer is large and overflows the data buffer. In a case where the disk array system is connected to a computer system transferring a large-size data such as image or graphic data which cannot be entirely stored in the data buffer, if there is conducted a transfer control operation similar to that employed in the high-transaction rate, the microprocessor 18 is required to divide the process of a command from the computer system into a plurality of process to achieve the control operation of data transfer according to the available or free state of the buffer 16. Namely, it is necessitated to monitor the data transfer state. In such a case, according to the present invention, the buffer 16 can be used as an FIFO memory. For this purpose, the counter 103 of the transfer control circuit 15 is used to partition the buffer 16 into eight regions physically corresponding to the disk units 21.

When data transferred from the computer system is to be written in the disk units 21, the microprocessor 18 indicates information about the data distribution mode and an initiation of data transfer to the transfer control circuits 12 and 20. On receiving the transfer indication, the transfer control circuits 12 and 20 start transferring data between the computer system and the buffer 16 and between the buffer 16 and the disk units 21, respectively. At this time, the generator 207 of each of the transfer control circuits 12 and 20 computes an address of the pertinent region of the buffer for the data transfer. The address is periodically assigned within an address range allocated to each region. Moreover, the data transfer is carried out with a data count specified in the data transfer control information. Consequently, the buffer control circuit 15 controls data input and output operations by the counter 103 for each region of the buffer 16, thereby using the buffer 16 as an FIFO memory. When all of the specified data transfers are completed, each of the transfer control circuits 20 and 12 notifies a termination of transfer to the microprocessor 18. Through the above operation, the data distribution and the FIFO control of the buffer 16 are accomplished by hardware. Even for data having a large amount exceeding the capacity of the buffer 16, the microprocessor 18 can conduct the processing in the command unit.

The disk array system of the present invention can flexibly cope with a case where data of a small size are to be transferred in a high-transaction rate and a case where data having a large size is to be transferred. Whether or not the buffer 16 is controlled to function as an FIFO memory can be selected according to whether or not the counter 103 is used. The selection can be conducted by the transfer control circuits 12 and 20 and hence the case where data of a small size are to be transferred in a high-transaction rate and the case where data having a large size is to be transferred can be handled by restricting only the address range of each buffer 16 region.

In addition, the disk array system of the present invention has a function to detect a set of data or an event of data collection. In a case where data read from the disk units 21 are collected or integrated such that the integrated data is transmitted to the computer system, a termination of the integration of data is detected by hardware.

Figure 8:
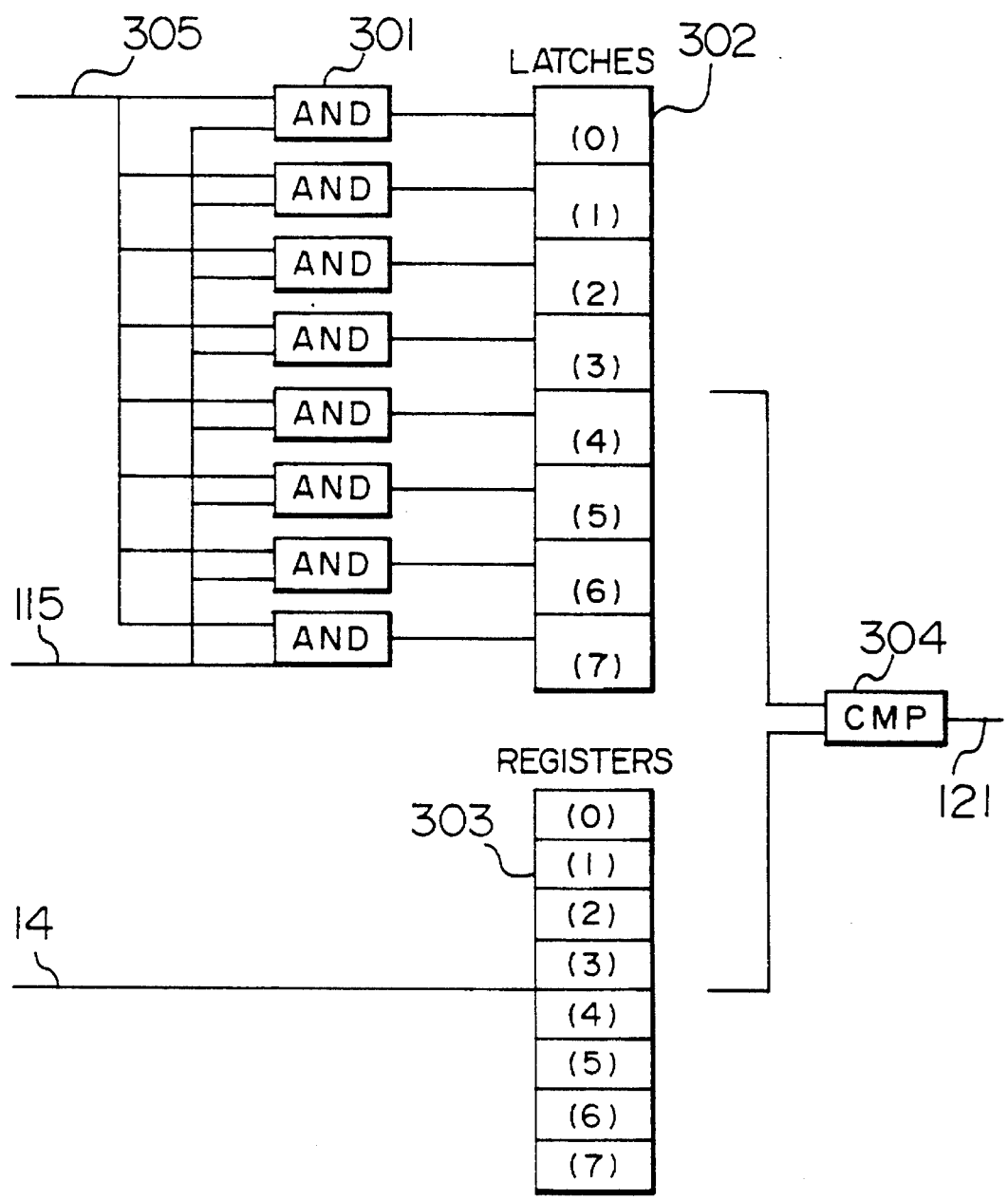
FIG. 8 is a block diagram showing the configuration of a data group detecting circuit.

FIG. 8 shows the configuration of the detecting circuit 105. The detecting circuit 105 includes a termination detecting circuits 301, a termination state latches 302, an integration detection condition registers 303, an integration detecting circuit 304, and a number 305 assigned to a transfer control circuit of a transfer destination disk.

In a data integration detection, the microprocessor 18 first sets detection conditions to the registers 303 to detect the integration termination based on a notice from which one of transfer control circuits 20 and indicates the initiation of data transfer. When transferring the last segment to the buffer 16, the transfer control circuit 20 initiates the data transfer in a mode in which a transfer termination flag of transfer termination information 115 is "ON". In the transfer operation, when the flag is "ON" in the information, the detecting circuit 105 sets a bit of the latch 302 to "ON" according to the transfer control circuit number 305 and the transfer termination information 115.

Comparison is effected between the latches 302 and the registers 303. When the integration detection conditions are satisfied as a result, an interruption signal 121 denoting data integration detection is sent to the microprocessor 18.

Thanks to the function, the microprocessor 18 can knowledge the data integration not by reports of transfer termination from the plural transfer control circuits 20 but by only one interrupt signal.

Furthermore, the function is applicable not only to the detection of a data integration or the data collection but also to an operation to detect that the respective transfer control circuits 20 are completely ready for the pertinent operation. In this case, when ready for the operation, each transfer control circuit 20 sets a transfer termination flag in the data transfer control information and transfers data without specifying the destination of data transfer. In this situation, the buffer control circuit 15 only sets the latches 302 to terminate the transfer and then issues the interrupt signal to the microprocessor 18 when the termination state of each of the associated circuits 20 is set in the latch 302.

According to the embodiment, when transferring data, the microprocessor indicates an address of the buffer to be used, information for data distribution, and the like to the respective transfer control circuits. As a result, a plurality of data segments can be transferred without intervention of the microprocessor. During the data transfer, the microprocessor can generate information for a subsequent data transfer to indicate the information to the respective transfer control circuits. After the data transfer being executed is completed, the transfer control circuits can immediately execute the subsequent data transfer, which consequently increases the utilization efficiency of the bus to transfer data.

Resultantly, the microprocessor can be released from the data transfer control operation frequently executed. In a case where data to be transferred from and to a computer is divided into segments to control the data transfer and the transfer state in the controller in units of segments, the control operation frequently takes place. Since the control operation is effected by the microprocessor according to the prior art, there does not exist any free time for the microprocessor to conduct another job while the data transfer is being conducted. Moreover, the data transfer itself lowers the system performance due to the overhead time caused by the processing of the microprocessor.

Furthermore, in a case where the disk array system of the present invention is connected to an upper-level computer system in which data having a large size exceeding the capacity of the data buffer is transferred, the data buffer can be used as an FIFO memory to increase the bus utilization efficiency in the data transfer operation. That is, even when the transfer data communicated with the computer system overflows the data buffer, there can be attained the maximum data transfer rate. Furthermore, the disk array system can flexibly cope with various cases of processing including a case of high-transaction rate processing of small-size data and a case of processing of large-size data.

In addition, thanks to an interruption from the data integration detector, the microprocessor can recognize an event that the data has been collected or integrated. Consequently, to recognize the event, the microprocessor need not to communicate with data transfer control circuit of the plural disk units, which reduces the amount of processing to be carried out by the microprocessor. Namely, this simplifies the processing to detect the operation state of the data transfer control circuits operating independently of each other, and hence the processing speed can be increased.

While particular embodiments of the invention have been shown and described, it will be obvious to those skilled in the art that various changes and modifications may be made without departing from the present invention in its broader aspects.

We claim:

1. A disk array system having a plurality of disk units classified into several groups, for supplying data stored in said plurality of disk units to an upper-level apparatus, comprising:

an upper-level data transfer control section controlling transfer of data to the upper-level apparatus;

a data buffer that temporarily stores data when said control section conducts data transfer to or from the upper-level apparatus;

a data buffer control circuit;

a drive data transfer control section disposed for each of the groups and controlling the data transfer between said data buffer and the disks unit belonging to said group, wherein said upper-level data transfer control section and said drive data transfer control section include means for generating and transmitting data related to a destination address and an amount of data to be transferred between said control section and said data buffer control circuit; and a main microprocessor section that controls said upper-level data transfer control section, said data buffer control circuit, and said drive data transfer control section, wherein said main microprocessor section includes:

a main microprocessor bus to control said upper-level data transfer control section, said data buffer control circuit, and said drive data transfer control section;

a data transfer bus that transfers data between said upper-level data transfer control section, said data buffer control circuit, said data buffer, and said drive data transfer control section, wherein said microprocessor section controls said upper-level data transfer control section, said data buffer control circuit, and said drive data transfer control section via said main microprocessor bus and transfers data between said upper-level data transfer control section or said drive data transfer control section and said data buffer via said data transfer bus.

2. A system according to claim 1, wherein said upper-level data transfer control section or said drive data transfer control section communicates data related to a destination address and an amount of data to be transferred between said control section and said data buffer control circuit, to transfer data between said control section and the data buffer.

3. A system according to claim 1, wherein said data buffer includes a storage area physically divided in association with said groups.

4. A system according to claim 3, wherein:

each of said upper-level data transfer control section and said drive data transfer control section receives information of a transfer destination of data and an address to be used in said data buffer from said microprocessor and achieves the data transfer in response to said information; and said data buffer control circuit measures input and output amounts of data to and from divided regions of said data buffer and accomplishes an FIFO control operation of said data buffer, data being transferred between said upper-level data transfer control section or said drive data transfer control section and said data buffer.

5. A system according to claim 1, further including a data group detecting circuit that detects that data transferred from said groups to said data buffer by said drive data transfer control section are integrated in said data buffer.

6. A system according to claim 5, wherein said data group detecting circuit includes:

means for detecting drive data transfer control section having terminated the data transfer;

means for setting said drive data transfer control means to be subjected to an operation to determine whether or not data are grouped; and a group detecting circuit responsive to said means for detecting and said means for setting so that it detects whether or not the data are completely grouped.

7. A disk array system having a plurality of disk units classified into several groups for storing data from an upper-level apparatus and for supplying the data stored to the upper-level apparatus, comprising:

an upper-level data transfer control section that controls transfer of the data to the upper-level apparatus;

a data buffer that temporarily stores the data when said control section conducts the data transfer to and from the upper-level apparatus;

a data buffer control circuit;

a drive data transfer control section disposed for each of said groups and that controls the data transfer between said data buffer and the disk units belonging to said group, wherein said upper-level data transfer control section and said drive data transfer control section includes means for generating and transmitting data related to a destination address and an amount of data to be transferred between said control section and said data buffer control circuit; and a main microprocessor section that controls said upper-level data transfer control section, said data buffer control circuit, and said drive data transfer control section, wherein said microprocessor section reserves, when an amount of data transferred from the upper-level apparatus at a time is equal to or less than a capacity of said data buffer, a utilization region of said data buffer, indicates said upper-level data transfer control section to transfer data to said data buffer, and indicates, after the data transfer to said data buffer is completed, said drive data transfer control section to transfer the data from the data buffer to the disk units; and said microprocessor section indicates, when an amount of data transferred from the upper-level apparatus at a time is more than the capacity of said data buffer, a utilization region of said data buffer, indicates a distribution mode of data and a data transfer to or from said data buffer to said upper-level data transfer control section and said drive data transfer control section.

8. A system according to claim 7, wherein said upper-level data transfer control section or said drive data transfer control section communicates data related to a destination address and an amount of data to be transferred between said control section and said data buffer control circuit, to transfer data between said control section and said data buffer.

9. A system according to claim 7, wherein said data buffer includes a storage area physically divided in association with said groups.

10. A system according to claim 7, wherein:

each of said upper-level data transfer control section and said drive data transfer control section receives information of a transfer destination of data and an address to be used in said data buffer from said microprocessor and achieves the data transfer data in response to the information; and said data buffer control circuit measures input and output amounts of data to and from the divided regions of said data buffer and accomplishes an FIFO control operation of said data buffer, data being transferred between said upper-level data transfer control section or said drive data transfer control section and said data buffer.

11. A system according to claim 7, further including a data group detecting circuit for detecting that the data transferred from said groups to said data buffer by said drive data transfer control section are integrated in said data buffer.

12. A system according to claim 11, wherein said data group detecting circuit includes:

means for detecting the drive data transfer control section having terminated the data transfer;

means for setting drive data transfer control means to be subjected to an operation to determine whether or not data are grouped; and a group detecting circuit responsive to said means for detecting and said means for setting so that it detects whether or not the data are completely grouped.

* * * * *

UNITED STATES PATENT AND TRADEMARK OFFICE
CERTIFICATE OF CORRECTION

PATENT NO. : 5,530,830                           Page 1 of 2
DATED     : June 25, 1996
INVENTOR(S) : Hidehiko IWASAKI et al.

It is certified that error appears in the above-identified patent and that said Letters Patent is hereby corrected as shown below:

IN THE ABSTRACT:  Line 7, delete "the" (second occurrence).

| Column | Line | |
|---|---|---|
| 1 | 53 | Change "supplying" to --supply--. |
| 2 | 43 | After "operation" insert --in--. |
| 2 | 54 | Change "Will" to --will--. |
| 3 | 49 | Change "valance" to --balance--. |
| 3 | 62 | Change "In the case" to --in this case--. |
| 4 | 37 | Change "requests" to --request--. |
| 4 | 48 | After "consideration," change "to" to --a-- |
| 5 | 2 | Change "becomes to be" to --reaches--. |
| 6 | 57 | Change "process" to --processes--. |

UNITED STATES PATENT AND TRADEMARK OFFICE
CERTIFICATE OF CORRECTION

PATENT NO. : 5,530,830
DATED : June 25, 1996
INVENTOR(S) : Hidehiko IWASAKI et al.

It is certified that error appears in the above-identified patent and that said Letters Patent is hereby corrected as shown below:

| Column | Line | |
|---|---|---|
| 7 | 49 | Change "which on of" to --the relevant--. |
| 7 | 64 | Change "knowl" to -- acknowl- --. |
| 8 | 54 | Before "communicate" delete "to". |
| 9 | 11 | Change "disks unit" to --disk units--. |
| 10 | 1 | After "detecting" insert --if the--. |
| 10 | 2 | change "having" to --has--. |
| 10 | 64 | After "transfer" delete "data". |
| 12 | 1 | After "detecting" insert --if the--. |
| 12 | 2 | Change "having" to --has--. |

Signed and Sealed this

Third Day of December, 1996

*Attest:*

BRUCE LEHMAN

*Attesting Officer*  *Commissioner of Patents and Trademarks*